June 18, 1929.　　　C. A. BREWER　　　1,717,911
APPARATUS FOR SOIL TILLAGE
Filed June 23, 1924　　　2 Sheets-Sheet 1
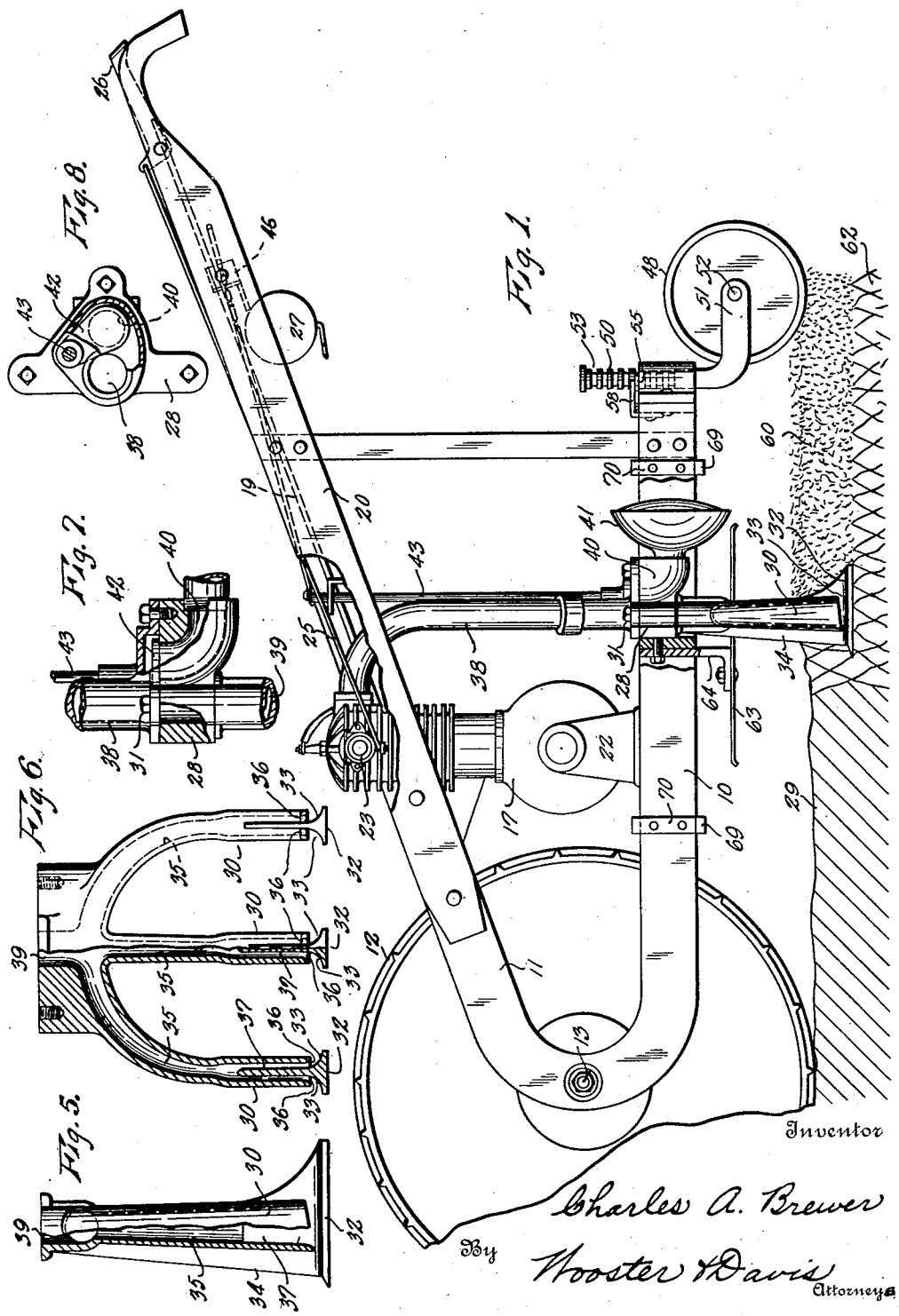
Inventor
Charles A. Brewer
By Wooster & Davis
Attorneys

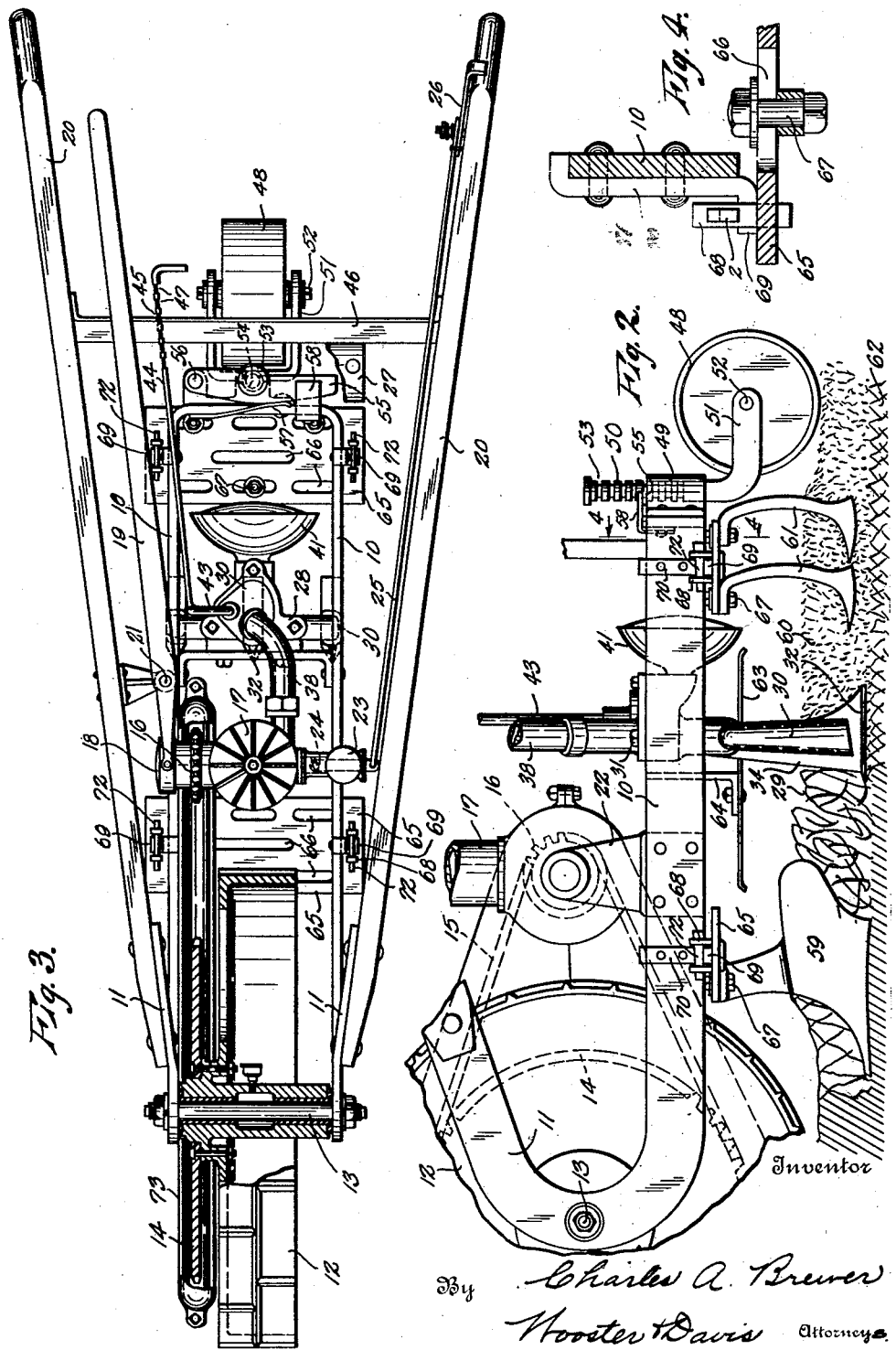

Patented June 18, 1929.

1,717,911

UNITED STATES PATENT OFFICE.

CHARLES A. BREWER, OF NOROTON HEIGHTS, CONNECTICUT, ASSIGNOR TO MARY V. BREWER, OF NOROTON HEIGHTS, CONNECTICUT.

APPARATUS FOR SOIL TILLAGE.

Application filed June 23, 1924. Serial No. 721,735.

This invention relates to a process and apparatus for treating soil for tillage purposes, and has for an object to provide a device for this purpose which will be simple in construction, which will be convenient and easy to operate, and which will have a much more beneficial effect on the soil than the ordinary tillage apparatus, thus giving a greater plant growth and yield.

With the foregoing and other objects in view, I have devised the construction illustrated in the accompanying drawings forming a part of this specification, similar reference characters being employed throughout the various figures to indicate the corresponding elements. In these drawings, Fig. 1 is a side elevation of a device embodying my invention, certain elements being broken away to more clearly show the construction.

Fig. 2 is a similar view showing the use of different tools in connection with the device.

Fig. 3 is a top plan view of the machine as shown in Fig. 2, certain elements being shown in section.

Fig. 4 is a detail sectional view substantially on line 4—4 of Fig. 2.

Fig. 5 is a partial side elevation and partial section of the hollow cultivator teeth.

Fig. 6 is a partial rear elevation and partial section of these teeth looking from the right of Fig. 5.

Fig. 7 is a partial elevation and partial section of the means for controlling the action on the soil, and Fig. 8 is a top plan view thereof with a portion of the cover broken away.

It has been found in soil treatment that the more thoroughly the soil is broken up and aerated the greater will be the plant growth and also the greater the yield. This desired result is also greatly increased by breaking up or loosening the subsoil which facilitates the penetration of moisture and allows the roots to run down deeper. It has further been found that this desired breaking up and loosening of the soil may be effectively secured by means of an explosion within the soil either, by exploding an explosive within the soil or by exploding it outside the soil and discharging the gases from the explosion into the soil under high pressure so that the effect of the explosion will shatter the soil thoroughly loosening and breaking it and at the same time cracking or loosening the subsoil. In my present invention I have devised a device which will thoroughly shatter and loosen the soil by means of a succession of explosions, using the gases formed by these explosions with a pulsating pressure, and it is so constructed that it may be employed in a manner similar to the use of an ordinary cultivator, but which will furnish its own power for the cultivating operation, as by means of an internal combustion motor, and at the same time will utilize the explosive forces of the exhaust from the motor for exploding or shattering the soil.

Referring to the accompanying drawings, the device which is illustrated for carrying out my invention comprises a suitable vehicle including a frame 10. This frame for simplicity of construction and ease in manufacture is preferably made of a single strip of metal bent substantially U-shaped in a horizontal plane, as shown in Fig. 3, and having its free ends 11 bent upwardly and backwardly, as shown in Figs. 1 and 2. This frame carries all of the devices and tools of the apparatus. Mounted to rotate between the upturned ends is a drive wheel 12 mounted on a suitable cross shaft 13 extending between the sides of the frame, the wheel being driven by sprocket 14 connected thereto driven by any suitable means, such as a chain 15, from a smaller sprocket 16 driven by an internal combustion motor 17, which is preferably the ordinary gasoline motor, and the drive of the sprocket 16 is controlled by any suitable type of friction clutch 18 arranged to be thrown in or out of operation by lever 19 extending where it is easily accessible for operation by the operator. The machine is guided by suitable handles 20 secured to the upturned ends 11 of the frame, these handles extending rearwardly where they may be easily grasped by the operator. The clutch control lever 19 may be pivoted to one of these handles at 21 with its free end adjacent the grip of the handle for easy manipulation. If the clutch is thrown out the device may be easily drawn around a corner or run to any given position.

The motor 17 is mounted on any suitable supports 22 secured to the frame 10. This motor is controlled and operated in the usual manner, a suitable carburetor 23 being provided having a throttle valve 24 controlled by a rod 25 leading to a finger lever 26 adjacent the grip of one of the handles, and a fuel tank 27 is mounted between the handles. Any suitable ignition device may also be employed, such as a magneto.

Mounted between the sides of the frame as by a bracket 28 and projecting downwardly therefrom so as to extend into the soil, indicated at 29, are one or more hollow cultivator teeth 30. Any desired number may be used, there being three shown in the present case, spaced from each other transversely to the direction of movement. As shown these three teeth are made in one piece as indicated in Fig. 6, and are connected to the under side of the bracket 28 by suitable bolts 31. The specific construction of these teeth as shown is very efficient in operation for loosening and shattering the soil. At the lower end of each tooth is an elongated shoe 32 having curved side surfaces 33 at the upper part thereof with a tapered rib 34 at the front to facilitate movement of the teeth through the soil, and the body portion has a passage 35 leading to the discharge openings 36 which are directed downwardly toward the curved surfaces 33. The passage is divided by a rib 37 so that the gases will be equally divided and directed to the opposite sides of the shoe. It will be noted that in operation these shoes are below the surface of the soil and will first break up and loosen the soil and then the explosive gases from the discharge openings 36 will shatter this loosened soil thoroughly breaking it up and leaving it in a fine loose condition.

The explosive gases for shattering the soil are secured from the motor 17 which is used to furnish power for operating the device. The exhaust pipe 38 is led downwardly to the member 28 and conducts the exhaust gases to the passage 39 where they are distributed to the passages 35 in the respective teeth. The member 28 is provided with a by-pass 40 leading to the atmosphere as through a muffler 41, and the entrance to the by-pass or the hollow cultivator teeth is controlled by a valve 42 which may be swung to close either passage by means of a lever 43 operated by a rod 44 leading to a position accessible for easy manipulation by the operator. A convenient means for holding this valve in a given position is provided by forming a notch 45 in the cross bar 46 and providing the rod 44 with a series of notches 47 so that the reduced portion caused by these notches may rest in the notch 45 and hold the valve in the adjusted position. It will be apparent that by adjusting this valve the explosive force on the soil may be adjusted as desired, that is, all the exhaust gases may be discharged through the hollow cultivator teeth or to the atmosphere, or by placing the valve in intermediate positions the relative proportion of the gases fed to the teeth or discharged to the atmosphere may be regulated as desired.

For regulating the depth to which the cultivator teeth or other tools used project into the soil a small wheel or caster 48 is adjustably mounted at the rear end of the frame. This may be mounted in any suitable manner but I prefer to provide a bearing 49 in which the upper rod 50 is adapted to turn, this rod having a fork 51 extending on opposite sides of the wheel 48 and carrying the transverse shaft 52 therefor. The bearing rod 50 is provided with a series of grooves 53 arranged at different heights adapted to be seated in a notch 54 in a catch lever 55 pivoted to the frame at 56. A suitable spring 57 is mounted on the frame and tends to hold this catch with the notch 54 seated in one of the grooves 53. A stop 58 may be provided to limit the movement of the catch lever. It will be apparent that by this movement the height of the wheel 48 may be adjusted giving different distances to which the hollow cultivator or other tools will project into the soil.

Under certain conditions I prefer to use additional tools in conjunction with the hollow explosive teeth 30, as for instance, where the soil is relatively hard and firm. In Figs. 2 and 3, I have shown two sets of tools, one forwardly and one rearwardly of the explosive teeth. Forwardly of the teeth I have shown a plow 59 which will first loosen and break up the soil or turn it over, the explosive teeth 30 will further loosen and break the soil, and then the explosive force of the gases which are discharged from these teeth will thoroughly shatter and break up the soil, leaving it in a fine fluffy condition as indicated at 60, and the soil may be further stirred by the cultivator teeth 61 located to the rear of the explosive teeth. The force of the explosive gases will also loosen and crack the subsoil, as indicated at 62. I also preferably provide above the explosive teeth 30 a baffle plate 63 which will prevent the fine soil thrown upwardly by the force of the explosions from being thrown into the mechanism or thrown into the face of the operator. This plate may be secured to the frame in any suitable manner as by a bracket 64.

Improved means are provided for mounting the auxiliary tools, such as the plow 59 and the cultivator teeth 61, so that they may be easily and quickly applied or removed from the frame, to thus reduce the time and labor required in setting up the machine or adjusting it for different operations or different widths of rows to be cultivated. A simple and convenient means comprises a supporting plate 65 having a series of elongated slots 56 in which the tools may be adjustably supported as by bolts 67. At the opposite ends of the plate is a U-shaped member 68 having its free ends extending through openings in the plate and they are located to extend on opposite sides of laterally projecting lugs 69 carried by the sides of the frame, as by means of a strap 70 secured to the frame by rivets 71.

The free ends of the member 68 are provided with openings for a tapered pin 72 which when in position rests on the top of the lugs 69. It will be apparent that different supporting plates 65 may be used for different tools and these may be set up outside the machine as desired to be used for different operations or different widths of rows to be cultivated. These different setups form unit assemblies of the tools. In setting up the machine all that is necessary is to place the desired unit assembly with the member 68 about the lugs 69 and then drive in the tapered pins 72 which will securely mount the assembly in position. In changing to another setup all that is necessary is to drive out the tapered pins, remove the old assembly and mount the desired new one in position.

To protect the operating mechanism and especially the chain drive from dust and dirt it is enclosed in a suitable guard and casing 73, which is preferably made in sections so that it is easily removable for inspection, oiling or repair.

From the foregoing descripton it will be seen that the device is very simple in construction and may be operated in a manner similar to the ordinary cultivators, that in addition to stirring and loosening the soil as is done by the ordinary cultivator the soil is thoroughly shattered and broken up by the force of the explosive gases from the motor which is used to advance the device in operation. Not only do these explosive gases thoroughly shatter and break up the top soil but they also crack the subsoil, converting it into a moisture absorbing soil. The thoroughly breaking up and shattering of the top soil thoroughly aerates it facilitating the movement of moisture which is very necessary to plant growth, and it also facilitates penetration of the roots through the soil greatly increasing and stimulating plant growth. Furthermore the carbon dioxide of the exhaust gases from the motor and other compounds of hydrogen, oxygen and nitrogen are thoroughly distributed throughout the soil increasing the substances required for plant growth. These gases also destroy pests in the soil by destroying the pests themselves, their eggs and the larvæ of these pests. In short, this thorough shattering and breaking of the soil greatly increases the plant growth and the yield for a given area.

Having thus set forth the nature of my invention, what I claim is:

1. In a soil tillage apparatus, a member projecting into the soil and having a gas conducting passage with a substantially unrestricted discharge opening beneath the surface thereof and movable horizontally through the soil, an internal combustion motor, and means for conducting exhaust gases from the motor to said passage so that the gases are discharged below the surface of the soil with sufficient pressure to shatter the same.

2. In a soil tillage apparatus, a member projecting into the soil and having a gas conducting passage with a substantially unrestricted discharge opening beneath the surface thereof, an internal combustion motor for moving said member horizontally through the soil, means for conducting exhaust gases from the motor to said member so that they are discharged through said opening into the soil, said motor adapted for operation at such a speed that the gases are delivered to said member with a pulsating pressure and under sufficient pressure to shatter the soil.

3. In a soil tillage apparatus, a cultivator tooth having a gas conducting passage therein and adapted to extend into the soil and having a substantially free and unrestricted discharge opening beneath the soil surface, means for moving said tooth horizontally through the soil including an internal combustion engine, and means for conducting the exhaust gases from said engine to said hollow tooth, said engine being adapted to discharge the gases into said tooth in differentiated charges under pressure and in rapid succession to give a pulsating and hammering effect.

4. In a soil tillage device, a vehicle, an internal combustion motor for propelling said vehicle, a plurality of hollow teeth carried by said vehicle projecting into the soil in position to be moved horizontally through the soil and spaced from each other transverse to the direction of movement, said teeth being provided with elongated shoes at the lower ends thereof extending in the direction of movement and also having laterally curved side walls, said teeth being further provided with discharge openings below the surface of the soil directed toward said curved side walls, and means for conducting exhaust gases from the motor to said teeth to be discharged under pressure through said openings.

5. In a soil tillage device, a soil stirring tooth having a gas conducting passage therein and arranged to project into and be moved horizontally through the soil, said tooth being provided with downwardly and laterally directed substantially unrestricted discharge openings below the surface of the soil leading from said passage, and means for progressively introducing a fluid into said tooth with a pulsating pressure and under sufficient pressure to shatter the soil as it is discharged from said openings.

6. In a soil tillage device, a hollow tooth arranged to project into and be moved horizontally through the soil, said tooth being provided with a longitudinally extending gas conducting passage and a substantially unrestricted discharge opening from said passage beneath the soil surface, and means for progressively introducing a fluid with a pulsating pressure into said tooth to be discharged through said opening into the soil and under sufficient pressure to shatter the soil.

7. In a soil tillage device, a plurality of hollow teeth arranged to project into and be moved horizontally through the soil, said teeth being spaced from each other transverse the direction of movement and provided with lateral substantially unrestricted discharge openings beneath the surface of the soil, and means for progressively introducing a fluid into said teeth with a pulsating pressure and under sufficient pressure to shatter the soil.

8. In a soil tillage device, a plurality of hollow members arranged to project into and be moved horizontally through the soil, said members being spaced from each other transverse the direction of movement and having elongated shoes at the lower ends thereof extending in the direction of movement and provided with laterally curved side walls, said members being also provided with discharge openings directed toward said side walls, and means for progressively introducing the exhaust gases from an internal combustion motor into said members.

9. In a soil tillage apparatus, a plurality of hollow teeth adapted to extend into the soil and having substantially free and unrestricted discharge openings beneath the soil surface, means for moving said teeth horizontally through the soil, an internal combustion motor, and means for conducting the exhaust gases from said motor to said hollow teeth to be discharged thereby through said openings beneath the soil surface.

10. In a soil tillage apparatus, a plurality of teeth adapted to project into the soil, means for moving said teeth horizontally through the soil, an internal combustion motor, and said teeth being each provided with a gas conducting passage having a substantially free and unrestricted discharge opening for introducing the exhaust gases from the motor in close proximity to the soil working portions of the teeth and beneath the soil surface.

11. In a soil tillage device, a vehicle, an internal combustion motor carried by said vehicle, a plurality of hollow teeth carried by said vehicle and projecting into the soil in position to be moved horizontally through the soil and spaced from each other transverse to the direction of movement, said teeth being provided with substantially unrestricted discharge openings below the surface of the soil, and means for conducting exhaust gases from the motor to said teeth to be discharged through said openings under pressure to shatter the soil.

12. In a soil tillage apparatus, a hollow member adapted to extend into the soil and having a substantially unrestricted discharge opening beneath the soil surface, means for moving said member horizontally through the soil including a vehicle on which the said member is mounted, an internal combustion motor mounted on said vehicle, and means for conducting the exhaust gases from said motor to said hollow member, said motor being adapted to discharge the gases into said member in distinct charges and under sufficient pressure to shatter the soil.

In testimony whereof I affix my signature.

CHARLES A. BREWER.